(No Model.) 2 Sheets—Sheet 1.
J. H. HARRINGTON.
COUPLING FOR PIPES TO CONVEY HEAT FROM CAR TO CAR.
No. 431,518. Patented July 1, 1890.
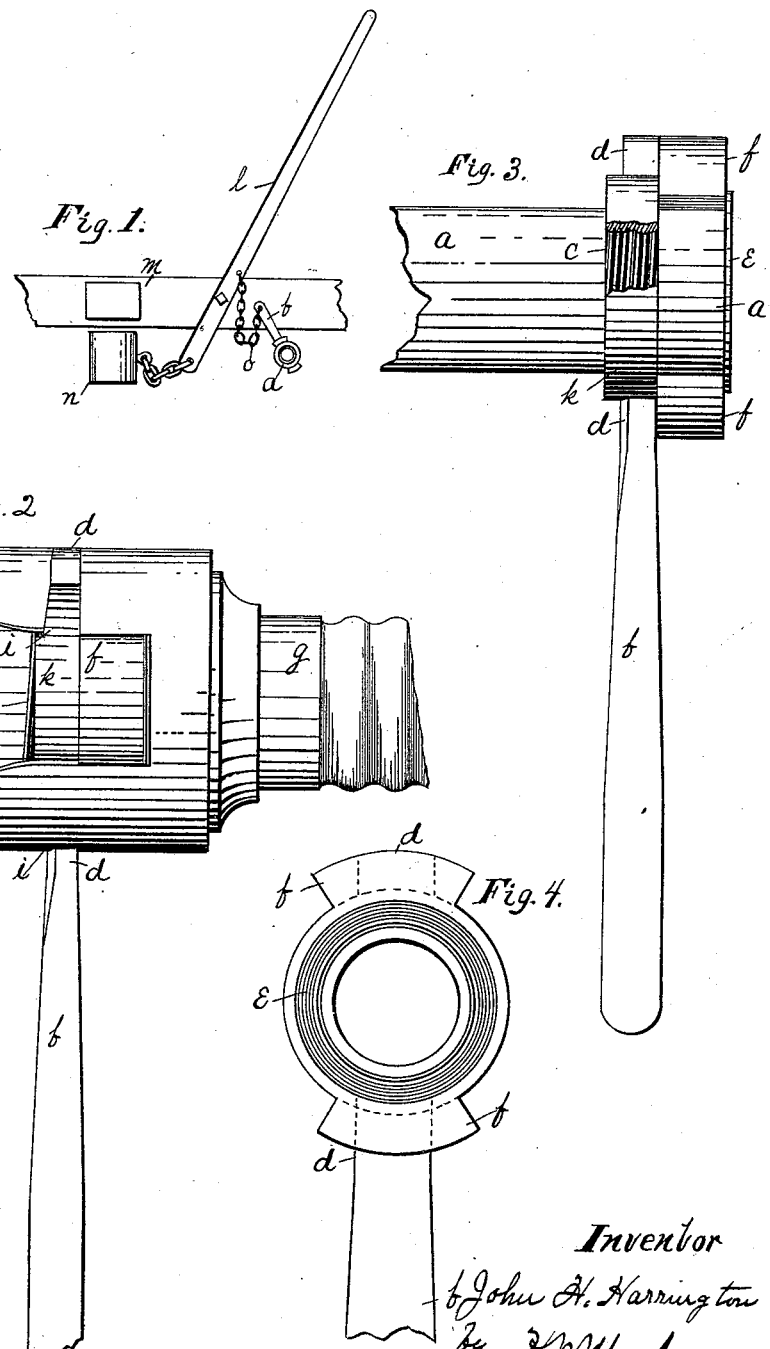

(No Model.) 2 Sheets—Sheet 2.

J. H. HARRINGTON.
COUPLING FOR PIPES TO CONVEY HEAT FROM CAR TO CAR.

No. 431,518. Patented July 1, 1890.

Witnesses
Fred. A. Mason
C. O. Mason

Inventor
John H. Harrington
by H. W. Mason
atty.

UNITED STATES PATENT OFFICE.

JOHN H. HARRINGTON, OF NEW BEDFORD, MASSACHUSETTS, ASSIGNOR OF ONE-HALF TO NATHANIEL B. KERR, OF SAME PLACE.

COUPLING FOR PIPES TO CONVEY HEAT FROM CAR TO CAR.

SPECIFICATION forming part of Letters Patent No. 431,518, dated July 1, 1890.

Application filed November 21, 1889. Serial No. 331,115. (No model.)

*To all whom it may concern:*

Be it known that I, JOHN H. HARRINGTON, a citizen of the United States, residing at New Bedford, in the county of Bristol and State of Massachusetts, have invented a new and useful Improvement in Couplings to Couple the Pipes which Convey the Heating Medium from Car to Car in Railway-Trains, of which the following is a specification.

My invention consists in the peculiar construction and arrangement of the different parts shown in the accompanying drawings, in which—

Figure 5:
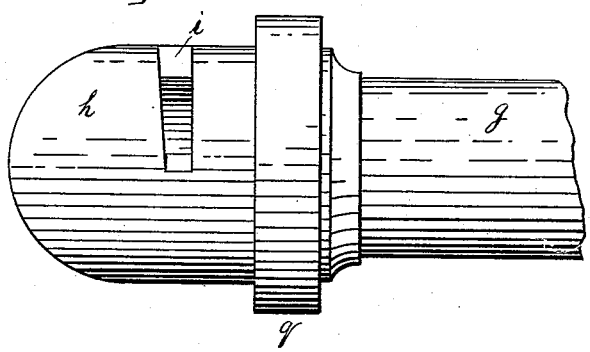
Figure 6:
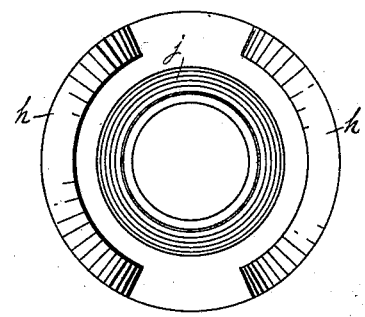
Figure 7:
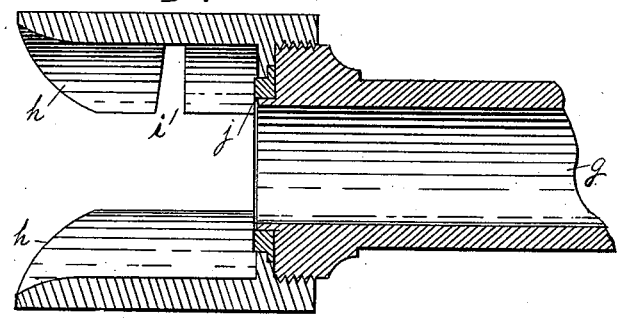
Figure 8:
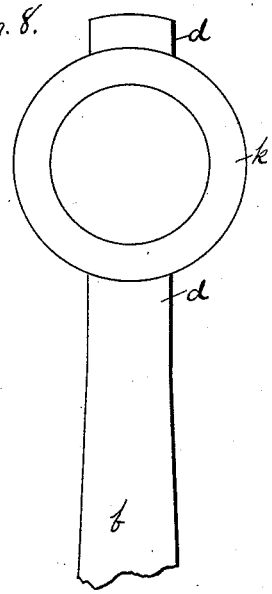

Figure 1 represents an end view of a section of the platform of a car, showing the position and mode of operating the coupling in order to uncouple the same. Fig. 2 represents a side view of my improved coupling as it appears when the two parts are connected. Fig. 3 represents a side view of that part of the coupling which carries the locking device. Fig. 4 is an end view of Fig. 3. Fig. 5 represents a side view of that part of the coupling which is interlocked with that shown in Fig. 3. Fig. 6 is an end view of Fig. 5. Fig. 7 is a view in longitudinal section of Fig. 5. Fig. 8 represents a view of the locking device.

In Fig. 1 $m$ represents the platform, $n$ the car-coupling, and $l$ the lever, which operates the same. That part of the coupling represented by $a$ is rigidly secured to the platform or car, and the handle $b$ of the locking device is connected by a chain $o$ to the lever $l$ in such a manner that when the lever $l$ is operated to uncouple the cars the pipe-coupling is also uncoupled by the same motion.

In Fig. 3 the part $a$ is provided with the segmental peripheral projections $f$ and the screw-thread $c$. The annular packing $e$ is seated in its face in the usual manner. The collar $k$ of the locking device is screw-threaded interiorly to engage with the screw-thread $c$, and is provided with the projections $d$, having each one inclined side, one of said projections being elongated into a handle $b$.

The part $g$ is adapted to be attached to a flexible pipe, and is provided with the ring $q$, having the projections $h$, provided with the openings $i$, having inclined sides to correspond with the inclined sides of the projections $d$ of the locking device. The ring $q$ is shouldered on the inside to secure the annular packing $j$ in place, and is screwed to the head of the part $g$, as shown. The ring $q$, carrying the projections $h$, is thus constructed, in order that the packing $j$ may be renewed, when necessary, and, also, that if the projections $h$ should become bent or broken from any cause, it may be removed by unscrewing from the part $g$ and replaced by another one.

The locking device is mounted on the screw-thread $c$ in order that when the packings $e$ and $j$ become so much compressed or worn that the locking device will not draw them together sufficiently to make a tight joint the part $a$ may be loosened in its position and given a half-turn, so that the locking device shall be at a greater distance from the face of the coupling and therefore bear more firmly against the inclined sides of the openings $i$ to draw the coupling together.

What I claim, and desire to secure by Letters Patent, is—

The herein-described coupling, consisting of the part $g$, having the ring $q$, provided with the projections $h$, having openings $i$, and shouldered on the inside to secure in place the packing $j$ and screwed to the head of the pipe, as shown, and the part $a$ having seated in its face the packing $e$, and provided with the projections $f$, and the screw-thread $c$, and having the collar $k$, working on the said screw-thread and provided with the projections $d$, having each one inclined side to correspond with the inclined sides of the openings in the projections $h$, one of said projections $d$ elongated into a handle $b$ for operating said collar $k$, and projections $d$ to lock the two parts of the coupling together.

JOHN H. HARRINGTON.

Witnesses:
HENRY W. MASON,
THOS. M. JAMES.